INVENTOR.
Frank Wesley Lane
BY
*David Katz.*
ATTORNEY

Patented June 12, 1951

2,556,726

UNITED STATES PATENT OFFICE 2,556,726

COPPER-PHTHALOCYANINE IN PIGMENTARY BETA FORM AND A PROCESS OF MAKING THE SAME

Frank Wesley Lane, Elkton, Md., assignor to E. I. du Pont de Nemours & Company, Wilmington, Del., a corporation of Delaware Application March 5, 1949, Serial No. 79,902

5 Claims. (Cl. 260—314.5)

This invention relates to novel phthalocyanine coloring matters and to a process of producing the same. More particularly this invention relates to a novel physical form of copper-phthalocyanine and related coloring matters in a finely divided, solid state, characterized by high tinctorial strength and by tinctorial stability when incorporated into vehicles containing aromatic liquids.

It is an object of this invention to produce phthalocyanine pigments in the so-called beta crystalline form but in a sufficiently fine state of subdivision to be useful for incorporation into liquid coating compositions, such as paints, varnishes and printing inks. Other and further objects of this invention will appear as the description proceeds.

For the sake of facilitating the discussion, I shall take up particularly the properties of copper-phthalocyanine, without, however, any intent to limit this invention thereby.

Copper-phthalocyanine exists in two crystalline forms which have been designated in the art as the alpha and the beta modifications. The beta modification was first described (without naming it so) by J. M. Robertson in the Journal of the Chemical Society, 1935, page 615. The existence of the alpha modification was recognized later. Summarized descriptions of the two crystal modifications, and their influence on the physical and tinctorial properties of copper-phthalocyanine may be found in FIAT Final Report No. 1313, vol. III, PB No. 85172. These two modifications are most clearly characterized by their X-ray diffraction patterns, which are so different that it is not only possible to recognize qualitatively the crystal modification of a given sample, but also to estimate quantitatively the relative amounts of the two types in mixtures.

Figure 1:
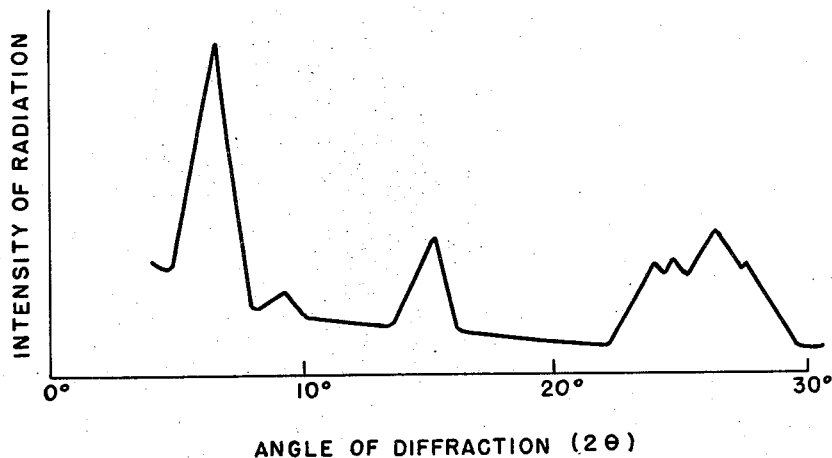
Figure 2:
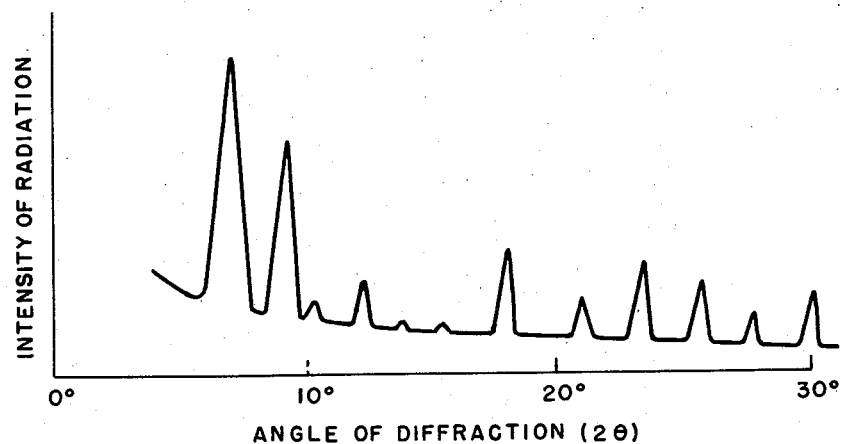

For purposes of clearer understanding, reference is made to the accompanying drawing which depicts the X-ray diffraction patterns of copper-phthalocyanine, as determined by bombardment of powder samples of the pigments with the $K\alpha$ radiation of a copper target. Figure 1 relates to the alpha form; Figure 2 to the beta form.

The alpha and beta modifications of copper-phthalocyanine exist at two different energy levels, the alpha form having more energy bound in its crystalline structure than the beta modification. As a result, the alpha form is metastable with respect to the beta, and tends to revert to the more stable form. Thus, the alpha modification is transformed spontaneously and rapidly into the beta form when heated over 300° C. Reversion of the alpha form to the beta form also occurs when the pigment in the alpha form is exposed to any of a wide variety of organic liquids. Although, from the technical point of view, copper-phthalocyanine is considered insoluble in organic liquids, many such liquids have a sufficient solvent action on the alpha form to produce a solution saturated with respect to the beta form. The effect of this is to continuously dissolve the alpha form and transform it into crystals of the beta form, until substantially the entire pigment has been transformed.

Furthermore, in this transformation there seems to be a strong tendency for the beta crystals to grow in size. Large crystals on the other hand are the antithesis of tinctorial strength. Consequently, when a finely divided, high tinctorial quality, alpha copper-phthalocyanine (produced for instance by "acid-pasting") is put into contact with an aromatic liquid, it is slowly transformed into the beta form with an attendant loss of tinctorial strength. If the system is heated, the transformation takes place much faster. All of this constitutes a highly unfortunate property from the practical viewpoint, inasmuch as many organic liquids which have such a solvent action on the alpha form of copper-phthalocyanine are commonly used as thinners or diluents in surface coating compositions in which the color is employed as a pigment. Under such conditions, the pigment may lose much of its original tinctorial strength in the storage period between the preparation of the composition and its final use.

Crude copper-phthalocyanine is usually (although not always) isolated in its beta modification from the reaction mixtures in which it is produced. As has already been stated, the beta modification may also be produced by transition from the alpha form by the action of heat or solvents. However, most environments which are favorable for the formation of the beta modification are also favorable for crystal growth unless special precautions are taken. As a result, the minimum particle size of the beta modification of copper-phthalocyanine as known in the past has seldom been less than 10 microns, and was frequently as high as 50 microns.

If copper-phthalocyanine is to be used as a pigment, its ultimate particle size must be extremely small, regardless of its crystal form. Therefore, the particle size of crude copper-phthalocyanine must be greatly reduced before it can be used successfully as a pigment. As a means of producing a pigmentary form, precipi tation of copper-phthalocyanine from its solution in sulfuric acid (the so-called "acid-pasting" process) invariably produces the alpha form. Grinding beta copper-phthalocyanine with salt according to U. S. Patent No. 2,402,167 produces at first a finely divided salt-pigment mixture from which the salt must be extracted with water. Such a process invariably produces the alpha form. Other ordinary methods of particle size reduction, such as conventional dry milling or wet ball milling with water, micropulverization or micronization, have proved to be incapable of producing the required degree of subdivision.

I have now found that copper-phthalocyanine in beta form and in extremely fine state of subdivision, which I shall hereinafter designate as the pigmentary state because of its suitability for use in pigment in paints and printing inks, may be produced by subjecting copper-phthalocyanine to ball milling in the presence of a wide variety of organic liquids. Aromatic and aliphatic hydrocarbons, such as xylene, kerosene or iso-octane give noticeable improvements in respect to the aims of this invention. But products of highest tinctorial quality are obtained if the liquid selected is an oxygenated, lower aliphatic hydrocarbon derivative free of reactive groups, such as carboxy or aldehyde groups; accordingly, acetone and the lower alkanols are examples of the preferred liquids.

For instance, if copper-phthalocyanine is milled in a ball mill in the presence of one of the aforegoing preferred liquids, the product obtained after separation from the metal balls and removal of the organic liquid (by evaporation or steam distillation) is characterized by being essentially completely in the beta crystalline form but of fine crystal size of high tinctorial quality, and suitable for incorporation into paints, varnishes and printing inks. Acetone is particularly effective for this purpose. The particle size of the color is less than 0.2 micron, and mostly between 0.01 and 0.1 micron. Its tinctorial stability with respect to aromatic liquids is much superior to that of the alpha form of the same pigment (obtained for instance by "acid-pasting").

Not only do I obtain by this process the beta crystal modification of copper-phthalocyanine in a finely divided pigmentary form, but I have also found that this product has completely unexpected and novel properties which make it, in effect, a new commercial product in the phthalocyanine series. The hue is shifted markedly toward a greener shade of blue, and whereas all heretofore known forms of the beta modification have been of very low tinctorial strength, my new form approximates the tinctorial strength of the acid-pasted alpha modification, insofar as the difference in hue permits accurate strength comparisons to be made. At least 90% of the product consists of particles between 0.01 and 0.1 micron in length and, when boiled for 1 hour in xylene, no perceptible crystal growth is observed.

Apart from the choice of liquid grinding aid, the conditions for milling are not critical. The quantity of liquid must be sufficient to provide a freely flowing mass but may vary within wide limits. However, efficient operation of a wet ball mill requires a significant body in the slurry being ground and too much liquid materially reduces this efficiency. It is therefore desirable to define the practical limits of the liquid to be employed to between 5 and 10 parts per part of phthalocyanine pigment.

Likewise the mill load may vary over wide limits, it being usually expressed in terms of the volume of the mill load as related to the volume of the voids between the balls. Thus, with a material-void ratio of 1, the balls are barely covered and this represents a minimum load for practical operation. As the volume of load increases, the efficiency of grinding decreases with a practical upper limit for this operation at a material-void ratio of about 2.5. With a balance of all factors, the preferred ratio is between 1.5 and 2.0 but the invention is not limited thereto.

The size of the balls employed for grinding may vary, as may their material of construction. In general, iron or steel balls with a diameter between $1/8''$ and $1/4''$ are preferred. Iron is preferred over other materials primarily because of cost. Glass and ceramic balls are expensive and difficult to obtain in smaller sizes. Furthermore, their low specific gravity reduces their efficiency, but they have been successfully used. Other metals than iron may be used if economically feasible; thus, copper shot is entirely satisfactory, but is much too expensive for large scale use.

From the standpoint of grinding, the lower limit of size for the balls can be extremely small, successful grinds having been made with shot as small as 0.5 mm. (0.02 inch) diameter. With such small shot, however, the increased difficulty of removing the ground slurry from the bed of shot makes their use on a practical scale undesirable. With balls above about 0.25 inch diameter, the rate of grinding, as judged by the development of tinctorial strength, becomes relatively slow. Consequently, practical operation of this invention prefers the use of grinding balls with an average diameter between 0.1 inch and 0.25 inch.

Instead of a conventional ball mill in which a horizontal cylindrical shell rotates and the balls fall under the influence of gravity, any other apparatus providing frequent contact of the grinding balls under vigorous impulse may be used. For instance, the bed of balls may be in a vertical cylinder provided with a mechanical agitator such as described in U. S. Patent 1,956,293. The invention is not restricted to any particular form of apparatus.

Separation of the liquid medium from the final product may be achieved in any convenient manner, for instance steam distillation or ordinary distillation at atmospheric or subatmospheric pressure, or even simple filtration, and it may be followed by acid or alkaline extraction or both and by drying the pigment.

Without limiting this invention, the following examples are given to illustrate my preferred mode of operation.

*Example 1*

Fifty grams of a substantially chlorine-free crude copper-phthalocyanine (made substantially according to Example 1 of U. S. Patent No. 2,214,477 and exhibiting the beta crystal structure) and a mixture of 200 cc. of ethyl alcohol and 100 cc. of water were charged into a $1/3$ gallon porcelain ball mill containing a nominal 40% load of steel shot approximately 2 mm. in diameter, and ground together for several days. After separation of the slurry from the balls, the alcohol was distilled off; the pigment was then successively extracted with dilute acid and dilute alkali, and the residual paste was dried at about 80° C. The resulting bright blue pigment exhibited a tinctorial strength substantially equal to that of acid-pasted copper-phthalocyanine. However, the hue was shifted substantially toward the green as compared to the acid-pasted pigment, and the pigment exhibited the beta crystal structure when examined by X-ray diffraction, in contrast to the alpha structure of the acid-pasted form. The pigment showed no evidence of crystal growth on exposure to hydrocarbon solvents as judged either by microscopic examination or by evidence of changes in the tinting strength.

*Example 2*

Twenty grams of a substantially chlorine-free copper-phthalocyanine pigment, previously finished in the high-strength, alpha crystal form by salt milling as in U. S. Patent No. 2,402,167, together with 120 cc. of acetone, were placed in a glass jar of approximately 500 cc. capacity, containing about 1200 grams of steel shot. The jar was rotated at about 135 R. P. M. for several days and the slurry was then separated from the balls. After removal of the acetone by steam distillation, the pigment was successively extracted with dilute acid and dilute alcohol and then dried at 60° C. The resulting dry powder has substantially the same tinting strength as the original alpha form material but now exhibited the typical green hue of the beta crystal structure.

*Example 3*

One-hundred and eighty grams of a substantially chlorine-free crude copper-phthalocyanine of beta crystal structure, together with 1500 cc. of 91% isopropanol and 75 cc. of concentrated aqueous ammonia were charged into a stainless steel ball-mill with a total volume of about 1.8 gallons and containing 13,000 grams (approximately 40% nominal load) of steel balls of about $\frac{5}{32}$ inch in diameter. The mill was rotated at a speed of about 60 R. P. M. for 110 hours and the slurry was then strained from the balls, the isopropanol removed by steam distillation, the slurry made acid with sulfuric acid and boiled for 30 minutes. The pigment was then filtered from the mother liquor, washed free of salts, and finally washed with dilute aqueous ammonia, after which it was dried at about 80° C. The resulting dry pigment exhibited the typical green hue and brightness of the beta crystal form of copper-phthalocyanine and was about 15% stronger than a corresponding acid-pasted alpha crystal form copper-phthalocyanine.

*Example 4*

Forty-five pounds of a substantially chlorine-free copper-phthalocyanine in the form of a low strength crude pigment containing approximately 75% alpha crystals (as determined by X-ray diffraction) together with 225 pounds of acetone (99% purity) were added to a ball mill of approximately 200 gallons capacity, containing about 3600 pounds of steel shot (approximately ⅛" diameter). The mill was rotated at approximately 31 R. P. M. and, at the end of two hours, the slurry was quite thick and required dilution with 90 pounds of acetone. Rotation was continued and a further dilution with 135 pounds of acetone was made at about 6 hours giving a total load of 45 pounds pigment and 450 pounds acetone. Samples were taken from the mill at various intervals and examined by X-ray diffraction and indicated that at the end of 12 hours, about 90% of the pigment was in the beta form and, after about 24 hours, it was 100% in the beta form. Although grinding was continued to a total of 48 hours, there appeared to be an insignificant change in either hue or strength after about 30 hours. The slurry was then separated from the balls and the acetone removed by steam distillation, after which the pigment was extracted with 2% sulfuric acid, filtered, washed sulfate-free, re-slurried in dilute ammonia and again filtered, washed and dried at 60° C. The resulting dry pigment exhibited the beta crystal structure and was substantially greener in hue than a pigment finished from the same crude copper-phthalocyanine by conventional acid-pasting methods. It was also free from any tendency to grow crystals in boiling xylene in contrast to the pronounced tendency of the acid-pasted product to grow crystals under the same conditions. It was substantially the same tinctorial strength as the acid-pasted product, bearing in mind the great difficulty of accurately judging strength comparisons with pronounced differences in hue, and it exhibited unusual brilliance of shade.

It will be understood that the mode of procedure is capable of wide variation, without departing from the spirit of this invention. Thus, although the above description talks specifically of copper-phthalocyanine, the same invention may be applied with similar beneficial results to metal-free phthalocyanine, or any other metal-phthalocyanine which is capable of existing in two crystalline forms and which has a tendency to grow large crystals when in contact with aromatic solvents (for instance, nickel-phthalocyanine). It is a peculiar but well known characteristic of the phthalocyanine coloring matters that those phthalocyanines which have a significant amount of chlorine in the nucleus do not have the mentioned tendency to grow crystals in aromatic solvents. Therefore, although such chlorinated phthalocyanines may be subjected to good advantage to ball-milling under the conditions of this invention, this invention is concerned only with chlorine-free phthalocyanines, by which phrase I mean to include substantially chlorine-free copper-phthalocyanine, metal-free phthalocyanine, and phthalocyanines of metals other than copper.

The choice of organic liquid is dictated more by practical considerations than by the chemical nature of the liquid. On the one hand, there is the question of promoting crystal growth of the pigment in which the pure hydrocarbons are more active so that the resulting equilibrium particle size is undesirably large. On the other hand, liquids containing substantial amounts of water appear to have such limited solubility for the pigment as to be incapable of promoting the conversion of any alpha form crystals, which may be present, to the beta crystal structure. Some liquids, such as the lower aliphatic alcohols, exhibit a similarity to water in this respect even when relatively pure and are satisfactory for purposes of this invention only when the crude pigment is substantially 100% in the beta form. There is also the question of removing the liquid from the pigment, so that water miscible liquids, particularly those with boiling points below that of water, are desirable because of the relative ease of recovering the liquid by fractional distillation, which leaves an aqueous slurry adaptable for chemical extractions to remove impurities, such as small amounts of finely divided metal eroded from the surface of the balls. Finally, there is the question of chemical corrosion of the metal balls and the ball mill which necessarily excludes those liquids which have a significantly acid reaction in the presence of water. From this viewpoint, carboxylic acids and aldehydes are to be avoided. Suitable liquids, on the other hand, are in general the low molecular weight oxygenated aliphatic compounds with no free carboxy or aldehyde groups; the family of suitable liquids, thus includes: ketones, such as acetone; alcohols, such as methanol, ethanol and isopropanol; ethers, such as dioxane and ethylene glycol monoethyl ether; and amides, such as dimethyl formamide; also various liquid esters, and of course various mixtures of the aforegoing liquids. By "low molecular" hereinabove I mean that the compound has a total of not more than 6 carbon atoms, and has no continuous chain of more than 4 carbon atoms.

I claim as my invention:

1. As a new product, a pigment comprising an essentially chlorine-free phthalocyanine compound essentially in the form of beta crystals of a size not greater than 0.2 micron, said pigment being characterized by a greenish shade of blue compared to the shade of the same phthalocyanine color in acid-pasted form, said pigment being further characterized by substantial absence of tendency to increase its crystal size, with attendant loss of tinctorial strength, when boiled for 1 hour in xylene.

2. A process of producing a phthalocyanine pigment as defined in claim 1, which comprises subjecting a crude, essentially chlorine-free, pigment of the phthalocyanine series to ball milling in the presence of a volatile, liquid, oxygenated, lower aliphatic compound which is free of carboxy and aldehyde groups, and which has no unbroken carbon chain of more than 4 carbon atoms, the quantity of said volatile liquid being between 5 and 10 parts by weight for each part of pigment employed, and distilling off said volatile liquid prior to drying the pigment.

3. As a new product, a pigment comprising an essentially chlorine-free copper-phthalocyanine essentially in the form of beta crystals at least 90% of which are of a size between 0.01 and 0.1 micron, said pigment being characterized by a greenish shade of blue compared to the shade of copper-phthalocyanine in acid-pasted form, said pigment being further characterized by substantial absence of tendency to increase its crystal size, with attendant loss of tinctorial strength, when boiled for 1 hour in xylene.

4. A process of producing a phthalocyanine pigment as defined in claim 3, which comprises subjecting a crude, essentially chlorine-free, copper-phthalocyanine to ball milling in the presence of a volatile, liquid, oxygenated, lower aliphatic compound which is free of carboxy and aldehyde groups, and which has no continuous chain of more than 4 carbon atoms, the quantity of said volatile liquid being between 5 and 10 parts by weight for each part of pigment employed, then distilling off said volatile liquid and drying the pigment.

5. A process as in claim 4, the organic liquid being acetone.

FRANK WESLEY LANE.

REFERENCES CITED

The following references are of record in the file of this patent:

UNITED STATES PATENTS

| Number | Name | Date |
|---|---|---|
| 2,282,303 | Morrison et al. | May 12, 1942 |
| 2,305,379 | Detrick et al. | Dec. 15, 1942 |
| 2,486,304 | Loukomsky | Oct. 25, 1949 |